(12) United States Patent
Kurachi et al.

(10) Patent No.: US 6,821,893 B2
(45) Date of Patent: Nov. 23, 2004

(54) METHOD OF MANUFACTURING A SUBSTRATE FOR INFORMATION RECORDING MEDIA

(75) Inventors: Junji Kurachi, Takarazuka (JP); Kazuishi Mitani, Takarazuka (JP); Yasuhiro Saito, Takatuki (JP)

(73) Assignee: Hoya Corporation, Tokyo (JP)

( * ) Notice: Subject to any disclaimer, the term of this patent is extended or adjusted under 35 U.S.C. 154(b) by 1 day.

(21) Appl. No.: 10/105,853

(22) Filed: Mar. 25, 2002

(65) Prior Publication Data

US 2003/0003763 A1 Jan. 2, 2003

(30) Foreign Application Priority Data

Mar. 26, 2001 (JP) ........................................ 2001-087498

(51) Int. Cl.[7] ........................................... H01L 21/302
(52) U.S. Cl. ............................ 438/690; 216/22; 216/97
(58) Field of Search ................... 428/694 SG; 427/127; 438/690–693, 745, 747, 754, 756; 216/97, 99, 22

(56) References Cited

U.S. PATENT DOCUMENTS 5,499,731 A * 3/1996 Marshall ...................... 216/22
5,811,361 A * 9/1998 Miwa ........................... 501/70
5,851,939 A * 12/1998 Miwa ........................... 501/70
5,855,811 A * 1/1999 Grieger et al. ............. 252/79.3
6,451,720 B1 * 9/2002 Kishimoto et al. ........... 501/64
6,548,139 B2  4/2003 Sakai et al.
6,568,995 B1 * 5/2003 Mitani et al. ................. 451/36

FOREIGN PATENT DOCUMENTS

JP         2000-132829 A        5/2000

* cited by examiner

Primary Examiner—Long Pham
Assistant Examiner—Ginette Peralta
(74) Attorney, Agent, or Firm—Frishauf, Holtz, Goodman & Chick, P.C.

(57) ABSTRACT

There is provided a substrate for information recording media and a manufacturing method thereof, which allow an information recording medium to be driven reliably and stably even when the flying height is made lower than conventionally to cope with increased recording density of the data zone. Precision polishing is carried out on a glass substrate using a polishing agent. After the precision polishing, surface treatment is carried out using an etching liquid containing both hydrofluoric acid and a fluoride salt.

19 Claims, 5 Drawing Sheets

METHOD OF MANUFACTURING A SUBSTRATE FOR INFORMATION RECORDING MEDIA

BACKGROUND OF THE INVENTION

1. Field of the Invention

The present invention relates to a substrate for information recording media and a manufacturing method thereof, and more specifically to a substrate for information recording media used in information recording apparatuses such as hard disk drives and a manufacturing method thereof.

2. Prior Art

In recent years, there has been remarkable progress in information technology, and development of various types of information recording apparatus for storing information has been carried out with vigor. Hard disk drives (hereinafter referred to as "HDDs") form the mainstream of such information recording apparatuses.

In an HDD, recording and playback of information are carried out by means of a magnetic head flying over a data zone formed on a magnetic disk substrate. Driving methods used include a CSS (contact start/stop) method and a ramp load method.

In the CSS method, a CSS zone in which uniform minute undulations of height several tens of nm are formed is provided along the inner periphery or the outer periphery of the magnetic disk substrate. The magnetic head flies over the data zone of the magnetic disk substrate while the magnetic disk substrate is rotating, and slides over the CSS zone of the magnetic disk substrate when the magnetic disk substrate stops or starts up.

In the ramp load method, the magnetic head flies over the magnetic disk substrate while the magnetic disk substrate is rotating, and is stored in a predetermined storage position when the magnetic disk substrate stops.

In both the CSS method and the ramp load method, while the magnetic disk substrate is rotating, the magnetic head is thus raised up slightly from the magnetic disk substrate, and flies over the surface of the magnetic disk substrate with a gap (hereinafter referred to as the "flying height") of several tens of nm maintained between the magnetic head and the surface of the magnetic disk substrate.

In an HDD, it is necessary to prevent the magnetic head from contacting the magnetic disk substrate while flying over the magnetic disk substrate, thus preventing the magnetic head from being subjected to excessive resistance. To this purpose, art has been known from hitherto in which precision polishing is carried out using a polishing agent containing loose abrasive grains of mean grain diameter in a range of 0.3 $\mu$m to 3.0 $\mu$m, and then etching is carried out using silicofluoric acid, thus forming a large number of minute projections referred to collectively as "texture" on the surfaces of the magnetic disk substrate (Japanese Laid-open Patent Publication (Kokai) No. 2000-132829).

According to this prior art, upon etching the surfaces of the magnetic disk substrate with silicofluoric acid, polishing marks (abrasive marks) formed by the polishing agent during the precision polishing remain behind as projections, and hence a texture comprised of a large number of minute projections is formed on the surfaces of the magnetic disk substrate. Moreover, silicofluoric acid gives a slower etching rate and weaker etching than hydrofluoric acid or an aqueous solution of hydrofluoric acid containing potassium fluoride, and hence the surface roughness can be controlled to high accuracy.

Moving on, as the amount of information stored has increased enormously in recent years, there have been calls for HDDs that are small but have a large storage capacity. It has thus become necessary to increase the recording density of the data zone, and hence there have been calls to reduce the flying height (for example to 10 nm or less) to cope with this increase in the recording density of the data zone.

However, if the flying height is reduced, then the air layer between the magnetic head and the magnetic disk becomes thinner, and hence the floating stability of the magnetic head drops.

To reduce the flying height while maintaining stability, it is necessary not only to completely remove minute particles of foreign matter attached to the magnetic disk substrate so that the magnetic head will not collide with such foreign matter, but also improve the quality of the texture, thus improving the floating stability of the magnetic head. It is thus necessary to reduce the projection height of the minute projections as much as possible but increase the density of the minute projections, and moreover suppress variation in the projection height.

However, according to the prior art described above, even though the precision polishing is carried out using a polishing agent containing loose abrasive grains of mean grain diameter in a range of 0.3 $\mu$m to 3 $\mu$m, because the etching rate given by silicofluoric acid is low, abnormal linear or point-like projections having a large projection height are formed through the etching carried out after the polishing. As a result, there is a problem that if a magnetic disk manufactured from the magnetic disk substrate is driven with a flying height of 10 nm or less as described above, then there will be a risk of the magnetic head colliding with the abnormal projections, resulting in so-called head crashes or thermal asperity.

Moreover, according to the prior art described above, the maximum permitted value of the surface roughness Ra is 2.5 nm, and hence there is a problem of not being able to completely deal with the issue of the floating stability of the magnetic head at low flying height.

SUMMARY OF THE INVENTION

With the foregoing in view, it is an object of the present invention to provide a substrate for information recording media and a manufacturing method thereof, which allow an information recording medium to be driven reliably and stably even when the flying height is made lower than conventionally to cope with increased recording density of the data zone.

It is envisaged that, in the technical field of information recording media, in the future there will be calls to further increase the data zone recording density. To realize such an increase in the data zone recording density, it will be necessary to further reduce the flying height as described above, and hence to further reduce the projection height of the minute projections formed on the substrate surfaces.

One might think that to reduce the height of the minute projections, the depth of etching from the substrate surfaces should be reduced. However, if the depth of etching is reduced, then most of the compressed layers (polishing marks) formed through the polishing will remain, i.e. it will not be possible to remove the compressed layers sufficiently. As a result, when the substrate for information recording media is exposed to a high temperature during chemical strengthening treatment, sputtering or the like carried out after the minute projections have been formed, relaxation expansion will be brought about by the heat, and hence the minute projections will grow. Abnormal projections having a large projection height will thus arise, and hence there will be a risk of a magnetic head colliding with these abnormal projections and thus thermal asperity or head crashes occurring.

To obtain a desired floating stability suitable for reducing the flying height, it is thus necessary to reduce the projection height of the minute projections, and also suppress variation in the projection height which can occur due to relaxation expansion as described above. Specifically, to avoid the formation of abnormal projections having a large projection height, it is thought to be necessary to make the etching depth as large as possible and thus sufficiently remove the compressed layers.

The present inventors carried out assiduous studies from such a perspective, and as a result discovered that by adding an alkaline compound to hydrofluoric acid to produce an acidic solution containing a fluoride salt, and carrying out surface treatment on a substrate with this acidic solution, the surface roughness Ra of the substrate surfaces can be reduced reliably and the projection height can be kept down and made uniform; moreover, even upon subsequently carrying out heat treatment such as chemical strengthening treatment, relaxation expansion is not brought about by the heat, and hence minute projections having a low projection height can be formed at high density.

The present invention was achieved based on this discovery. Specifically, a method of manufacturing a substrate for information recording media according to the present invention comprises the steps of carrying out precision polishing on a glass substrate using a polishing agent and then carrying out surface treatment, wherein the surface treatment is carried out using an etching liquid containing both hydrofluoric acid and a fluoride salt.

Moreover, as a result of experiments carried out by the present inventors, it was found that if the amount of the alkaline compound added to the hydrofluoric acid is low, then there is no longer any significant difference from the case that the etching is carried out using only hydrofluoric acid and hence abnormal projections are prone to form as described above, whereas if too much of the alkaline compound is added to the hydrofluoric acid, then the number of minute projections is reduced and hence it is not possible to form a texture of a desired high density. There is thus an optimum range for the amount of the alkaline compound added to the hydrofluoric acid.

The present inventors thus carried out further assiduous studies from this perspective, and as a result discovered that if an etching liquid is used in which the ratio X of the sum of the concentration per mol of hydrofluoric acid and the concentration per mol of hydrogen ions to the sum of the concentration per mol of hydrofluoric acid and the concentration per mol of fluoride ions has been adjusted to be in a range of 0.3 to 0.98, preferably 0.56 to 0.93, then there is hardly any change in the projection height of the minute projections, and in the maximum height Rp of the projection height from the mean value thereof (hereinafter referred to as the "maximum projection height"), between before and after the heat treatment described above. Moreover, it is possible to obtain a substrate for information recording media having not less than 150 minute projections of projection height not less than 2 nm per 100 $\mu m^2$ (10 $\mu m \times 10$ $\mu m$) and with a maximum projection height Rp of less than 3.6 nm even after the heat treatment. As a result, a desired floating stability can be obtained even at a low flying height.

In the method of manufacturing a substrate for information recording media according to the present invention, the etching liquid is thus preferably prepared such that the ratio X of the sum of the concentration per mol of the hydrofluoric acid and the concentration per mol of hydrogen ions to the sum of the concentration per mol of the hydrofluoric acid and the concentration per mol of fluoride ions is in a range of 0.3 to 0.98, more preferably 0.56 to 0.93.

According to the above manufacturing method, a desired substrate for information recording media having minute projections at a high density can be manufactured, and moreover even if heat treatment such as chemical strengthening treatment or sputtering is carried out, the maximum projection height of the minute projections after the heat treatment can be kept down to less than 3.6 nm. A substrate for information recording media having an excellent floating stability even at a low flying height can thus be obtained.

Moreover, the above fluoride salt is produced by replacing hydrogen ions in the hydrofluoric acid with cations in the alkaline compound. However, it is undesirable for these cations to be divalent cations, since in this case a precipitate will be formed with the hydrofluoric acid.

The etching liquid is thus preferably a solution in which hydrogen ions have been replaced with other monovalent cations.

Furthermore, the monovalent cations are preferably alkylammonium ions, which tend not to produce a precipitate even if reaction occurs with another chemical substance in the etching liquid. It is undesirable for the monovalent cations to be ammonium ions, since in this case a precipitate will be produced with a silicon compound that leaches out from the glass substrate.

Moreover, when surface treatment is carried out on the glass substrate using an acidic etching liquid as described above, some of the constituent components of the glass substrate will leach out into the acidic solution, and hence a thin, soft altered layer having a low mechanical strength will be formed on the substrate surfaces. This altered layer can be removed by carrying out surface treatment using an alkaline solution.

In the method of manufacturing a substrate for information recording media according to the present invention, it is thus preferable for the surface treatment to comprise carrying out first surface treatment using an etching liquid as described above, and then carrying out second surface treatment using an alkaline solution.

By carrying out such second surface treatment using an alkaline solution, preferably an alkaline solution having a pH of not less than 12, after carrying out the first surface treatment, the altered layer described above can be removed, and hence the surface layer of the glass substrate can be hardened.

Moreover, as a result of further assiduous studies, the present inventors discovered that by carrying out pretreatment using an acidic solution, preferably of pH not more than 4, as a treatment liquid before carrying out the surface treatment, a yet larger number of minute projections can be formed on the surfaces of the glass substrate.

In the method of manufacturing a substrate for information recording media according to the present invention, pre-treatment is thus preferably carried out at least once using an acidic solution (preferably having a pH of not more than 4) before carrying out the surface treatment.

According to the above manufacturing method, a yet larger number of minute projections can be formed on the surfaces of the glass substrate. As a result, a substrate for information recording media having a yet further improved floating stability at low flying height can be manufactured, and startup of the information recording medium can be carried out yet more smoothly.

Moreover, because the pre-treatment is carried out using an acidic solution, as in the case of the surface treatment described above, an altered layer is formed on the surfaces of the glass substrate.

After carrying out first pre-treatment at least once using an acidic solution, it is thus preferable to carry out second pre-treatment using an alkaline solution, before carrying out the surface treatment.

Moreover, the polishing agent used in the precision polishing preferably contains loose abrasive grains having a mean grain diameter in a range of 0.01 $\mu$m to 3 $\mu$m.

According to the above manufacturing method, the depth of the compressed layers formed on the glass substrate surfaces through the precision polishing using the loose abrasive grains (hereinafter referred to as the "compression depth") can be made to be in a range of 2 nm to 15 nm, and as a result the desired texture can be obtained. If the compression depth is less than 2 nm, then the projection height of the minute projections will become too low, thus hampering the formation of the texture. On the other hand, if the compression depth exceeds 15 nm, then the compressed layers will no longer be dotted around but rather will become continuous lines following the abrasive marks formed by the abrasive grains, and hence ridge shapes will be formed through the etching instead of point-like minute projections, which is undesirable.

Furthermore, the present inventors carried out further assiduous studies with an aim of effectively obtaining a texture having a desired number of projections per unit area with a desired projection height, and as a result discovered that if the $SiO_2$ content in the glass composition is excessively high, then it becomes difficult to form the minute projections, whereas if the $Al_2O_3$ content is excessively high, then the probability of abnormal projections being formed becomes high, resulting in there being a risk of head crashes and thermal asperity arising.

It is thus preferable for the glass substrate to have a composition in which there is a certain relationship between the $SiO_2$ content and the $Al_2O_3$ content; Specifically, it is preferable for the difference between the $SiO_2$ content and half of the $Al_2O_3$ content to be in a range of 53 to 66 mol %, more preferably 58 to 64 mol %. Moreover, the glass substrate used in the substrate for information recording media is preferably made from an aluminosilicate glass, which has excellent water resistance and mechanical strength.

Moreover, the glass substrate used in the substrate for information recording media is preferably made from an aluminosilicate glass, which has excellent water resistance and mechanical strength. Specifically, the glass substrate preferably has a composition in a range of 63 to 70 mol % of $SiO_2$, 4 to 11 mol % of $Al_2O_3$, 5 to 11 mol % of $Li_2O$, 6 to 14 mol % of $Na_2O$, 0 to 2 mol % of $K_2O$, 0 to 5 mol % of $TiO_2$, 0 to 2.5 mol % of $ZrO_2$, and 0 to 6 mol % of MgO, 1 to 9 mol % of CaO, 0 to 3 mol % of SrO and 0 to 2 mol % of BaO, with an additional condition that the total content of MgO, CaO, SrO and BaO is in a range of 2 to 15 mol %.

Moreover, a substrate for information recording media according to the present invention, in which a large number of minute projections are formed on at least one surface of a glass substrate, is manufactured using a manufacturing method as described above. The substrate for information recording media is also preferably such that the density of minute projections having a projection height of not less than 2 nm is not less than 150 per 100 $\mu m^2$, and the maximum projection height from the mean value of the projection height is less than 3.6 nm.

According to the above substrate for information recording media, because the substrate for information recording media is manufactured using a manufacturing method as described above, and because the density of minute projections having a projection height of not less than 2 nm is not less than 150 per 100 $\mu m^2$, and the maximum projection height is less than 3.6 nm, it is possible to maintain a good floating stability such that head crashes, thermal asperity and the like do not occur even if driving is carried out at a low flying height of 10 nm or less.

To attain the object described above, the present invention provides . . .

(Claims 1 to 3) In a method of manufacturing a substrate for information recording media comprising the steps of carrying out precision polishing on a glass substrate using a polishing agent and then carrying out surface treatment, the surface treatment is carried out using an etching liquid containing both hydrofluoric acid and a fluoride salt, and moreover the etching liquid is preferably prepared such that the ratio X of the sum of the concentration per mol of the hydrofluoric acid and the concentration per mol of hydrogen ions to the sum of the concentration per mol of the hydrofluoric acid and the concentration per mol of fluoride ions is in a range of 0.3 to 0.98, more preferably 0.56 to 0.93. As a result, a desired substrate for information recording media having minute projections formed at a high density (texture) can be manufactured, and even if heat treatment such as chemical strengthening treatment or sputtering is carried out, the maximum projection height after the heat treatment can be kept down. A substrate for information recording media having an excellent floating stability even at a low flying height can thus be obtained.

(Claims 4 and 5) Moreover, the etching liquid is preferably a solution in which hydrogen ions have been replaced with other monovalent cations, and these monovalent cations are preferably alkylammonium ions. As a result, a precipitate will not be formed in the etching liquid, and hence the desired etching can be carried out smoothly.

(Claim 6) Moreover, the surface treatment preferably comprises carrying out first surface treatment using the etching liquid, and then carrying out second surface treatment using an alkaline solution. As a result, a soft altered layer having a low mechanical strength that is formed on the substrate surfaces through the first surface treatment can easily be removed through the second surface treatment, and hence the chemical durability of the surface layer can be increased.

(Claims 7 to 9) Moreover, before carrying out the surface treatment, it is preferable either for pre-treatment to be carried out at least once using an acidic solution, or for first pre-treatment to be carried out at least once using an acidic solution and then second pre-treatment to be carried out using an alkaline solution; in either case, the pH of the acidic solution is preferably not more than 4. As a result, a yet larger number of minute projections can be formed on the surfaces of the glass substrate, and hence smooth startup of a magnetic disk manufactured from the substrate for information recording media can be carried out yet more reliably, and the floating stability at low flying height can be yet further improved.

(Claims 10 to 11) Moreover, the composition of the glass substrate is preferably such that the difference between the $SiO_2$ content and half of the $Al_2O_3$ content is in a range of 53 to 66 mol %, more preferably 58 to 64 mol %. As a result, suitable minute projections, specifically such that the density of minute projections having a projection height of not less than 2 nm is not less than 150 per 100 $\mu m^2$, and the maximum projection height is less than 3.6 nm, can be formed effectively.

(Claim 12) In addition, the glass substrate preferably has a composition in a range of 63 to 70 mol % of $SiO_2$, 4 to 11 mol % of $Al_2O_3$, 5 to 11 mol % of $Li_2O$, 6 to 14 mol % of $Na_2O$, 0 to 2 mol % of $K_2O$, 0 to 5 mol % of $TiO_2$, 0 to 2.5 mol % of $ZrO_2$, and 0 to 6 mol % of MgO, 1 to 9 mol % of CaO, 0 to 3 mol % of SrO and 0 to 2 mol % of BaO, with an additional condition that the total content of MgO, CaO, SrO and BaO is in a range of 2 to 15 mol %. As a result, suitable minute projections, specifically such that the density of minute projections having a projection height of not less than 2 nm is not less than 150 per 100 $\mu m^2$, and the maximum projection height is less than 3.6 nm, can be formed effectively.

(Claim 13) Moreover, the polishing agent preferably contains loose abrasive grains having a mean grain diameter in a range of 0.01 $\mu m$ to 3 $\mu m$. As a result, the compression depth of the compressed layers formed on the glass substrate surfaces can be made to be in a range of 2 nm to 15 nm, and hence the desired texture can be obtained.

(Claims 14 and 15) Moreover, a substrate for information recording media according to the present invention is manufactured using a manufacturing method as described above, and furthermore is preferably made to be such that the density of minute projections having a projection height of not less than 2 nm is not less than 150 per 100 $\mu m^2$, and the maximum projection height is less than 3.6 nm. As a result, a substrate for information recording media can be obtained that enables good floating stability to be secured even if driving is carried out at a low flying height of 10 nm or less.

The above and other objects, features and advantages of the invention will become more apparent from the following detailed description taken in conjunction with the accompanying drawings.

BRIEF DESCRIPTION OF THE DRAWINGS

FIG. 4A shows a state after etching, with the surface of the glass substrate 10 before the etching being shown by an imaginary line; and FIG. 4B shows a state after an altered layer 8 has been removed by alkali washing;

FIG. 6A shows a level difference D formed on a surface of the glass substrate 20 by slightly etching uncompressed layers 13;

FIG. 6B shows a state after an altered layer 14 has been removed by alkali washing;

FIG. 6C shows a state after a large number of minute projections 2 and an altered layer 16 have been formed; and FIG. 6D shows a state after the altered layer 16 has been removed by alkali washing.

DETAILED DESCRIPTION OF PREFERRED EMBODIMENTS

Embodiments of the present invention will now be described in detail with reference to the drawings.

Figure 1:
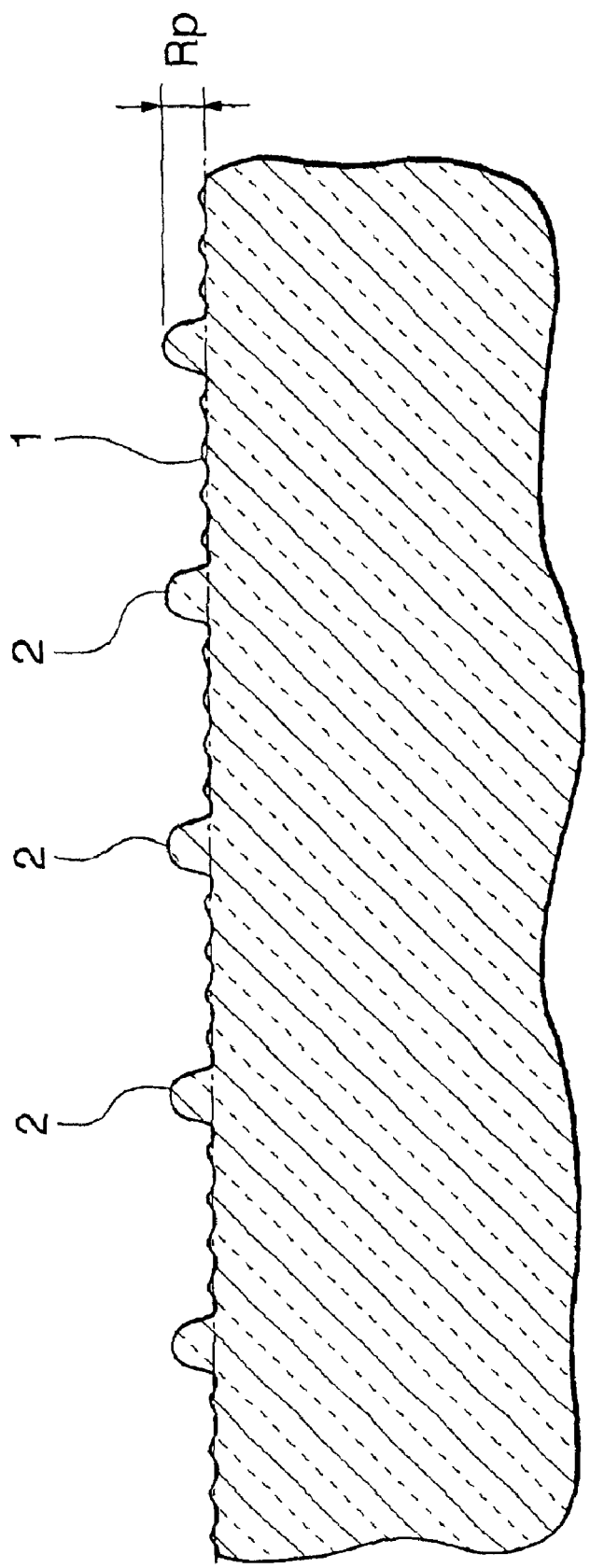
FIG. 1 is a sectional view showing main parts of a magnetic disk substrate, which is a substrate for information recording media according to an embodiment of the present invention.

FIG. 1 is a sectional view showing main parts of a magnetic disk substrate, which is a substrate for information recording media, manufactured using the manufacturing method according to the present invention. The magnetic disk substrate 1 is made of an aluminosilicate glass, and is such that there are at least 150 minute projections 2 having a projection height of at least 2 nm per 100 $\mu m^2$, and the maximum projection height Rp, which is the maximum height from the mean value of the projection height, is less than 3.6 nm.

In the field of HDDs, to cope with further increases in the data zone recording density in the future, it is necessary to make the flying height between the magnetic head and the magnetic disk be not more than 10 nm, and hence it is necessary to secure floating stability even in the case of driving at a flying height of 10 nm or less.

Moreover, it is necessary to ensure that trouble does not occur on startup due to the magnetic head and the magnetic disk sticking together, and hence it is necessary to form a large number of minute projections 2 on the surfaces of the magnetic disk substrate 1.

To be able to drive the magnetic disk smoothly and stably even in the case of a flying height of 10 nm or less, it is thus necessary to form a large number of minute projections 2 having a low and uniform projection height. To satisfy this requirement, in the present embodiment, the magnetic disk substrate 1 is formed such that there are at least 150 minute projections 2 having a projection height of at least 2 nm per 100 $\mu m^2$, and the maximum projection height Rp, which is the maximum height from the mean value of the projection height, is less than 3.6 nm.

A description will now be given of the method of manufacturing such a magnetic disk substrate 1.

Figure 2:
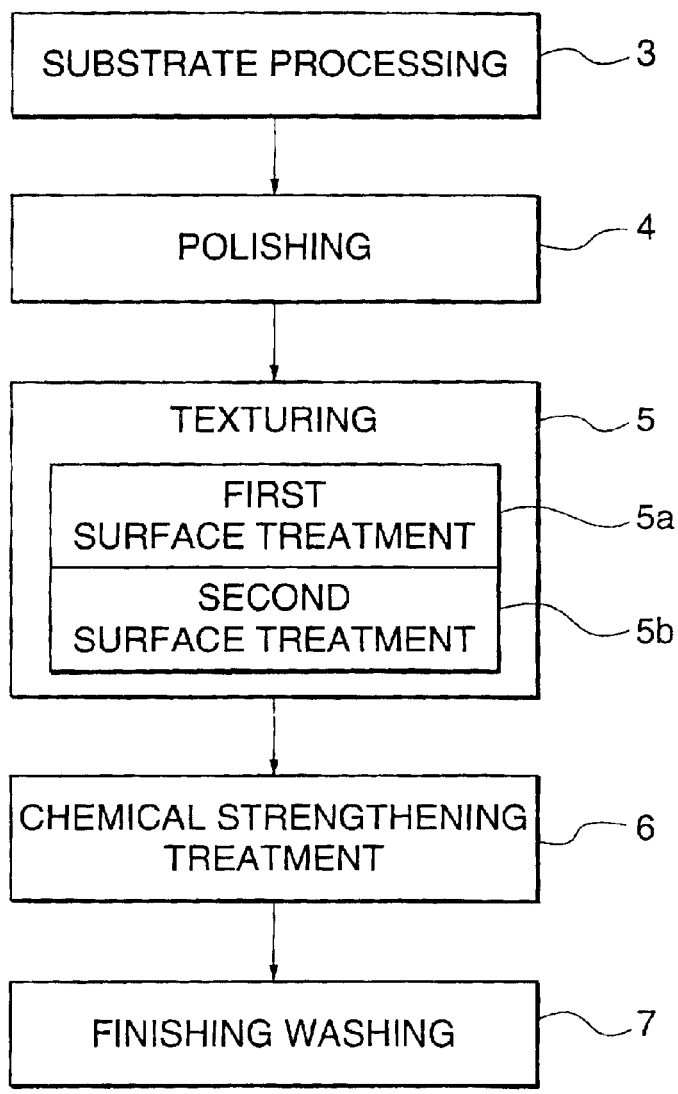
FIG. 2 is a flowchart showing a method of manufacturing a magnetic disk substrate 1 according to a first embodiment of the present invention.

FIG. 2 is a flowchart showing the method of manufacturing the magnetic disk substrate 1 according to a first embodiment of the present invention. As shown in FIG. 2, the magnetic disk substrate 1 is manufactured through a substrate processing step 3, a polishing step 4, a texturing step 5, a chemical strengthening treatment step 6, and a finishing washing step 7 in this order.

These manufacturing steps will now be described in order.
(1) Substrate processing step 3

In the substrate processing step 3, first a sheet-shaped glass substrate that constitutes the starting material of the magnetic disk substrate 1 is manufactured using a known float process.

Specifically, an aluminosilicate glass having a chemical composition of 63 to 70 mol % of $SiO_2$, 4 to 11 mol % of $Al_2O_3$, 5 to 11 mol % of $Li_2O$, 6 to 14 mol % of $Na_2O$, 0 to 2 mol % of $K_2O$, 0 to 5 mol % of $Ti_2O$ 0 to 2.5 mol % of $ZrO_2$, and 0 to 6 mol % of MgO, 1 to 9 mol % of CaO, 0 to 3 mol % of SrO and 0 to 2 mol % of BaO, with the additional condition that the total content of MgO, CaO, SrO and BaO is in a range of 2 to 15 mol %, is used for the glass substrate.

Reasons for setting the composition to be in this range will now be given.

$SiO_2$ is the principal constituent of the glass. If the $SiO_2$ content is less than 63 mol %, then the durability of the glass will worsen, whereas if the $SiO_2$ content is greater than 70 mol %, then the viscosity will become too high and hence melting will become difficult. In the present embodiment, the $SiO_2$ content was thus set to 63 to 70 mol %.

$Al_2O_3$ is a component that increases the rate of ion exchange during chemical strengthening treatment, and increases the durability of the glass. Moreover, $Al_2O_3$ is readily leached out by acidic aqueous solutions, and is thus a component that promotes etching by acidic aqueous solutions. However, if the $Al_2O_3$ content is less than 4 mol %, then the desired effects will not be exhibited, whereas if the $Al_2O_3$ content is greater than 11 mol %, then the viscosity will become too high and the devitrification resistance will drop, and hence melting will become difficult. In the present embodiment, the $Al_2O_3$ content was thus set to 4 to 11 mol %.

$Li_2O$ is an alkali metal oxide. The lithium ions in $Li_2O$ are replaced with alkali metal ions having a larger ionic radius than the lithium ions during chemical strengthening treatment, thus forming a layer having a high compressive stress, and hence improving the mechanical strength. Furthermore, $Li_2O$ also increases the meltability during glass melting, and moreover is readily leached out by acidic aqueous solutions, and is thus a component that promotes etching by acidic aqueous solutions. However, if the $Li_2O$ content is less than 5 mol %, then the surface compressive stress after the ion exchange will be insufficient, and moreover the viscosity will rise and hence melting will become difficult. On the other hand, if the $Li_2O$ content is greater than 11 mol %, then the chemical durability will worsen. In the present embodiment, the $Li_2O$ content was thus set to 5 to 11 mol %.

As with $Li_2O$, $Na_2O$ is an alkali metal oxide. The sodium ions in $Na_2O$ are replaced with alkali metal ions having a larger ionic radius than the sodium ions during chemical strengthening treatment. $Na_2O$ also increases the meltability during glass melting, and moreover is readily leached out by acidic aqueous solutions, and is thus a component that promotes etching by acidic aqueous solutions. However, if the $Na_2O$ content is less than 6 mol %, then the surface compressive stress after the ion exchange will be insufficient, and moreover the viscosity will rise and hence melting will become difficult. On the other hand, if the $Na_2O$ content is greater than 14 mol %, then the chemical durability will worsen. In the present embodiment, the $Na_2O$ content was thus set to 6 to 14 mol %.

$K_2O$ is also an alkali metal oxide. $K_2O$ increases the meltability during glass melting, and moreover promotes leaching out by acidic aqueous solutions, thus promoting etching by acidic aqueous solutions. $K_2O$ is thus added as necessary, but if the $K_2O$ content is greater than 2 mol %, then the chemical durability will worsen. In the present embodiment, the $K_2O$ content was thus set to 0 to 2 mol %.

$TiO_2$ is a component that increases the durability of the glass, and is added as necessary. However, if the $TiO_2$ content is greater than 5 mol %, then the liquid phase temperature of the glass will increase, and the devitrification resistance will worsen. In the present embodiment, the $TiO_2$ content was thus set to 0 to 5 mol %.

As with $TiO_2$, $ZrO_2$ is a component that increases the durability of the glass, and is thus added as necessary. However, if the $ZrO_2$ content is greater than 2.5 mol %, then there will be a risk of the $ZrO_2$ precipitating as minute crystals during melting of the glass. In the present embodiment, the $ZrO_2$ content was thus set to 0 to 2.5 mol %.

MgO is an alkaline earth metal oxide. MgO increases the meltability of the glass, and also promotes etching by acidic aqueous solutions. Moreover, MgO is added as appropriate to adjust the viscous properties and the expansion coefficient to aid forming of the glass. However, if the MgO content is greater than 6 mol %, then the liquid phase temperature of the glass will increase, and the devitrification resistance will worsen. In the present embodiment, the MgO content was thus set to 0 to 6 mol %.

As with MgO, CaO is an alkaline earth metal oxide. CaO increases the meltability of the glass, and also promotes etching by acidic aqueous solutions. Moreover, CaO is added as appropriate to adjust the viscous properties and the expansion coefficient to aid forming of the glass. For the desired effects to be exhibited, the CaO content must be at least 1 mol %. However, if the CaO content is greater than 9 mol %, then the liquid phase temperature of the glass will increase, and the devitrification resistance will worsen. In the present embodiment, the CaO content was thus set to 1 to 9 mol %.

As with CaO and MgO, SrO and BaO are alkaline earth metal oxides, which increase the meltability of the glass, and promote etching by acidic aqueous solutions. Moreover, SrO and BaO are added as appropriate to adjust the viscous properties and the expansion coefficient to aid forming of the glass. However, it is undesirable for the SrO content to be greater than 3 mol % or the BaO content to be greater than 2 mol %, since in this case the specific gravity of the glass substrate will become too high. In the present embodiment, the SrO content was thus set to 0 to 3 mol %, and the BaO content to 0 to 2 mol %.

Moreover, the contents of the above alkaline earth metal oxides, namely MgO, CaO, SrO and BaO, are determined in accordance with the contents of $SiO_2$, $Al_2O_3$ and $Li_2O$. In the present embodiment, the total content of these alkaline earth metal oxides is made to be in a range of 2 to 15 mol %.

The reason for this is as follows. If the total content of these alkaline earth metal oxides is less than 2 mol %, then the desired effect of promoting etching by acidic solutions will not be exhibited, whereas if the total content of these alkaline earth metal oxides is greater than 15 mol %, then there will be undesirable results for the magnetic disk substrate 1 such as the devitrification resistance worsening and the specific gravity becoming too high. In the present embodiment, the total content of the above alkaline earth metal oxides was thus set to 2 to 15 mol %.

Moreover, in the present embodiment, the composition of the aluminosilicate glass used for the glass substrate is made to be such that the $SiO_2$ content and the $Al_2O_3$ content satisfy the relationship given in equation (1) below.

($SiO_2$ content)−½($Al_2O_3$ content)=53~66 mol %, preferably 58~64 mol %.

The reason for this is as follows. In the polishing step 4 described below, a large number of compressed layers are formed on the surfaces of the glass substrate due to polishing marks, and then in the following texturing step 5 uncompressed layers (i.e. the parts other than the compressed layers) are etched more than the compressed layers, resulting in a large number of minute projections 2 being formed in the positions of the compressed layers. If the $SiO_2$ content is too high, then the difference in etching rate in the depth direction of the glass substrate between the compressed layers where compressive strain has been generated due to the polishing marks and the uncompressed layers where polishing marks have not been formed will drop, and hence the minute projections 2 will not be easily formed, and moreover even if minute projections 2 are formed the maximum projection height Rp will be too small.

On the other hand, if the $Al_2O_3$ content is raised, then because $Al_2O_3$ is easily leached out by acidic aqueous solutions, etching will be promoted at the uncompressed layers where the $Al_2O_3$ content is high, and hence there will be a tendency for abnormal projections having a maximum projection height Rp of 3.6 nm or more to be formed.

Consequently, if the difference between the $SiO_2$ content and half of the $Al_2O_3$ content is high, then minute projections 2 having a low projection height will be formed, but the number of projections will be low, and hence the magnetic disk and the magnetic head will become prone to sticking together, resulting in there being a risk of startup of the magnetic disk being hindered. On the other hand, if the difference between the $SiO_2$ content and half of the $Al_2O_3$ content is low, then the number of projections will increase, but abnormal projections will be formed, and hence thermal asperity and head crashes will become prone to occur.

In the present embodiment, the composition of the glass is thus made to be such that the relationship between the $SiO_2$ content and the $Al_2O_3$ content given in equation (1) above is satisfied, so that suitable minute projections 2 will be formed on the surfaces of the glass substrate, i.e. so that the density of those minute projections 2 having a projection height of at least 2 nm is at least 150 per 100 $\mu m^2$, and the maximum projection height Rp of the minute projections 2 is less than 3.6 nm.

The surfaces of the sheet-shaped glass substrate formed by a float process as described above are next ground using grindstones such as diamond grindstones, and then the inner and outer peripheral surfaces of the glass substrate are polished (mirror-finished), thus forming the glass substrate into a predetermined donut shape.

(2) Polishing step 4

In the polishing step 4, lapping is first carried out using a lapping apparatus with abrasive grains of alumina or the like having a predetermined grain size.

Next, the surfaces of the lapped glass substrate are precision polished using a polishing agent prepared by dispersing loose abrasive grains in a polishing liquid.

Figure 3:
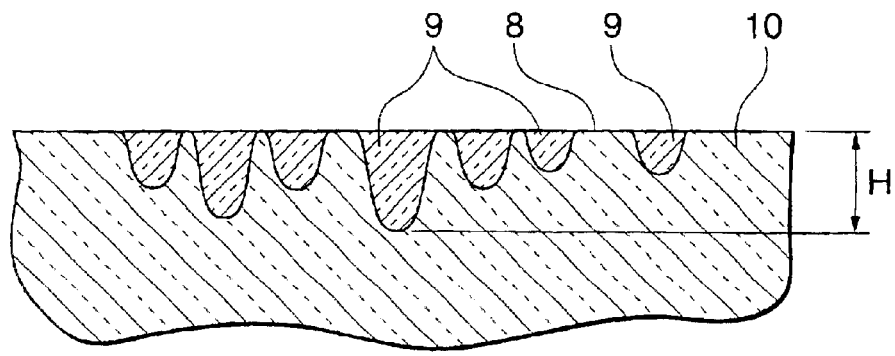
FIG. 3 is a sectional view of a glass substrate after being subjected to precision polishing in a polishing step 4.

In the precision polishing in the polishing step 4, the loose abrasive grains are pushed against the glass substrate 10, thus forming polishing marks, and as a result the surfaces of the glass substrate 10 are made to be such that compressed layers 9 where compressive strain has been generated due to the polishing marks and uncompressed layers 8 where polishing marks have not been formed are intermingled, as shown in FIG. 3. In the present embodiment, the grain diameter of the loose abrasive grains used in the precision polishing is selected such that the compression depth H of the compressed layers 9 is in a range of 2 to 15 nm.

The reason for this is as follows. If the compression depth H of the compressed layers 9 is less than 2 nm, then the projection height of the minute projections 2 formed in the etching described below will be too low, thus hindering the formation of the texture. On the other hand, if the compression depth H is greater than 15 nm, then the compressed layers 9 will no longer be dotted around but rather will be formed in continuous lines along the abrasive marks formed by the abrasive grains, and hence the etching described below will produce ridge shapes rather than point-like projections.

In the present embodiment, the precision polishing is thus carried out using loose abrasive grains such that the compression depth H of the compressed layers 9 is in a range of 2 to 15 nm. To carry out the precision polishing such that the compression depth H is in a range of 2 to 15 nm, the loose abrasive grains preferably have a mean grain diameter in a range of 0.01 to 3 $\mu m$.

There are no particular limitations on the type of the loose abrasive grains, but to obtain the excellent surface smoothness demanded of a substrate for information recording media, it is preferable to use cerium oxide ($CeO_2$), manganese oxide, zirconia, titania, silica ($SiO_2$) or diamond abrasive grains.

Moreover, there are no particular limitations on the polishing method, but it is preferable to use a both-surface polishing machine in which a suede-type polishing pad made of artificial leather is affixed to each of an upper plate and a lower plate, since then precision polishing of both surfaces of the glass substrate can be carried out at low cost.

(3) Texturing step 5

Next, the texturing step 5, which is comprised of first and second surface treatments 5a and 5b, is carried out.

First, in the first surface treatment 5a, an acidic solution containing both hydrofluoric acid and a fluoride salt is prepared by adding an alkaline compound to hydrofluoric acid, and etching is carried out using this acidic solution.

Figure 4A:
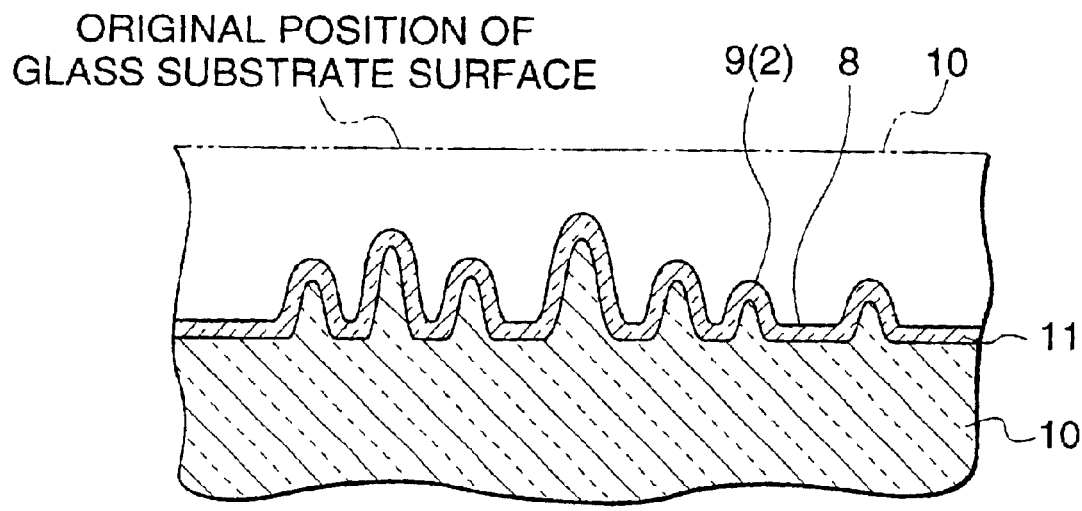
FIGS. 4A and 4B are sectional views of the glass substrate useful in explaining surface treatments carried out in a texturing step 5 in the first embodiment; specifically.

In the compressed layers 9, the $SiO_2$ is densified and hence impedes the leaching out of other components, resulting in the etching occurring only with difficulty. There is thus a considerable difference in the etching rate between the compressed layers 9 and the uncompressed layers 8. As shown in FIG. 4A, the compressed layers 9 and the uncompressed layers 8 are thus etched together, but because the etching rate is slower for the compressed layers 9 than for the uncompressed layers 8, a large number of minute projections 2 are formed on each of the surfaces of the glass substrate 10 in the positions of the compressed layers 9. (In FIG. 4A, the line at the top indicates the position of the surface of the glass substrate 10 before the etching).

When preparing the acidic solution, the alkaline compound is added to the hydrofluoric acid such that the ratio X defined in equation (2) below is in a range of 0.3 to 0.98, preferably 0.56 to 0.93, and then the first surface treatment 5a is carried out using this acidic solution as the etching liquid.

$$X=([HF]+[H^+])/([HF]+[F^-]) \qquad (2)$$

Here [HF] is the weight concentration per mol (wt %/mol) of hydrofluoric acid in the etching liquid, [$H^+$] is the weight concentration per mol (wt %/mol) of hydrogen ions in the etching liquid, and [$F^-$] is the weight concentration per mol (wt %/mol) of fluoride ions in the etching liquid.

In the case that the etching is carried out using only hydrofluoric acid, the number of minute projections 2 formed is proportional to the hydrofluoric acid concentration, i.e. the number of minute projections 2 drops if the hydrofluoric acid concentration is reduced, and increases if the hydrofluoric acid concentration is increased. Moreover, after the texturing has been carried out, the magnetic disk substrate 1 is usually subjected to chemical strengthening treatment in which the surface compressive stress is increased and hence the mechanical strength is improved. This chemical strengthening treatment is carried out in a molten salt at a high temperature as described below, and hence the minute projections 2 undergo relaxation expansion due to the heat and thus the projection height increases, resulting in their being a risk of thermal asperity or head crashes occurring.

In the present embodiment, to solve this problem, the first surface treatment 5a is thus carried out using as the etching liquid an acidic solution containing both hydrofluoric acid and a fluoride salt that has been prepared by adding an alkaline compound to hydrofluoric acid such that the ratio X defined above is in a range of 0.3 to 0.98, preferably 0.56 to 0.93.

The reasons for limiting the ratio X to be in such a range are as follows.

When hydrofluoric acid is in solution, most of the hydrofluoric acid molecules dissociate into hydrogen ions and fluoride ions. The hydrogen ions are replaced by the cations of the alkaline compound to form a fluoride salt, thus producing an etching liquid containing both hydrofluoric acid and a fluoride salt. If the ratio X is greater than 0.98, then the amount added of the alkaline compound is low, resulting in the hydrofluoric acid content being too high. There is thus no longer any significant difference to the case that the etching is carried out using only hydrofluoric acid. Abnormal projections having a large projection height of 3.6 nm or more are thus formed, i.e. it is difficult to form minute projections 2 having a uniform low projection height.

On the other hand, if the etching liquid is prepared such that the ratio X is less than 0.3, then the amount added of the alkaline compound is too high. As a result, there is hardly any difference in the etching rate between the compressed layers 9 and the uncompressed layers 8, and hence the density of the minute projections 2 becomes low.

In the present embodiment, the amount added of the alkaline compound is thus adjusted when preparing the etching liquid such that the ratio X is in a range of 0.3 to 0.98, preferably 0.56 to 0.93.

There are no particular limitations on the alkaline compound added to the hydrofluoric acid, but it is preferable to use an alkylammonium hydroxide that contains monovalent cations, for example tetramethylammonium hydroxide (hereinafter referred to as "TMAH") or trimethylammonium hydroxide. The reason for this is as follows. It is undesirable to use an alkaline compound that contains divalent cations, since then reaction with the hydrofluoric acid will produce a precipitate. Moreover, even in the case of an alkaline compound that contains monovalent cations, it is undesirable, for example, to use ammonium fluoride, since then $SiO_2$ contained in the glass substrate 10 will react with the ammonium fluoride to produce a precipitate ($(NH_4)_2SiF_6$). In contrast, in the case of an alkylammonium hydroxide as described above, a precipitate is not prone to be produced even if the alkylammonium hydroxide reacts with other chemical substances in the solution, and hence it is most preferable to use such an alkylammonium hydroxide as the alkaline compound.

After the first surface treatment 5a has been carried out as described above, in the second surface treatment 5b, alkali washing is carried out using an alkaline solution. The reason for this is as follows. As shown in FIG. 4A, in the first surface treatment 5a, minute projections 2 having a large projection height are formed in places where large, deep polishing marks have been formed, and minute projections 2 having a small projection height are formed in places where the polishing marks are only small or shallow; in addition, however, when the surface treatment is carried out using an acidic etching liquid as described above, an $SiO_2$-rich component is leached out, and as a result a thin altered layer 11 that is soft and has a low mechanical strength is formed on the surfaces of the glass substrate 10.

Figure 4B:
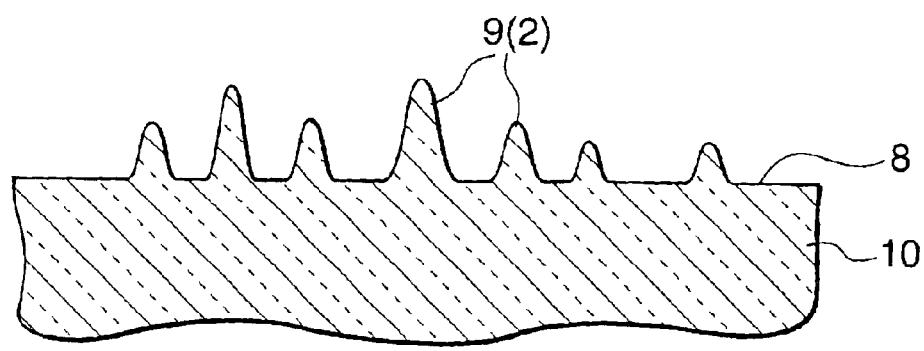

In the second surface treatment 5b, alkali washing with an alkaline solution is thus carried out to remove the altered layer 11 and hence harden the surface layer, as shown in FIG. 4B.

There are no particular limitations on the type of the alkaline solution, but to remove the altered layer 11 completely in a short time and with good efficiency, it is preferable for the alkaline solution to have a pH of not less than 12; specifically, potassium hydroxide, sodium hydroxide or the like can be used.

The treatment time and treatment temperature in the first and second surface treatments 5a and 5b can be selected as appropriate without particular limitation in accordance with the concentrations of the chemical solutions used, the etching rate of the glass substrate 10 and so on. Nevertheless, considering the manufacturing cost and the like, it is preferable to set the treatment time to be in a range of 1 to 20 minutes, and the treatment temperature to be not more than 70° C.

In the present embodiment, the method of carrying out the surface treatment is to immerse the glass substrate 10 in the etching liquid (first surface treatment 5a) or the alkaline solution (second surface treatment 5b). The immersion may be carried out while applying ultrasound to the glass substrate 10. In this case, ultrasound of one fixed frequency may be applied, or ultrasound of a plurality of different frequencies may be applied simultaneously, or the frequency of the ultrasound may be changed over time. Moreover, there are no particular limitations on the output power of the ultrasound, although in general the lower the frequency and the higher the output power, the greater the damage to the glass substrate 10, and hence it is preferable to select the output power while considering this point.

In addition to the immersion method described above, a shower method, a spraying method or the like may be used as the treatment method. In such a case, it is preferable to scrub the glass substrate 10 with sponges or the like.

(4) Chemical strengthening treatment step 6

After the first and second surface treatments 5a and 5b have been carried out as described above, the glass substrate 10 is washed and dried, and then the chemical strengthening treatment step 6 is carried out.

There are no particular limitations on the drying method. For example, an IPA vapor drying method in which the glass substrate 10 is immersed in isopropyl alcohol (IPA) vapor, or a spin-drying method in which the washing water is removed by rotating the glass substrate 10 at high speed, can be used.

In the chemical strengthening treatment step 6, chemical strengthening treatment is carried out in which the glass substrate 10 is immersed for a predetermined time in a molten salt maintained at a predetermined high temperature, for example a molten salt comprised of a mixture of potassium nitrate ($KNO_3$) and sodium nitrate ($NaNO_3$), thus replacing $Li^+$ and $Na^+$ in the chemical components of the glass substrate 10 through ion exchange with $K^+$, which has a larger ionic radius than $Li^+$ and $Na^+$. By carrying out such chemical strengthening treatment, the surface compressive stress of the glass substrate 10 is increased, and hence breakage of a magnetic disk manufactured using the glass substrate 10 during rotation at high speed can be prevented.

(5) Finishing washing step 7

In the finishing washing step 7, alkali washing is carried out by immersing the glass substrate 10 is in an alkaline solution, while irradiating with ultrasound if necessary, thus removing residual foreign matter such as iron powder stuck to the glass substrate 10, and hence completing the manufacture of the magnetic disk substrate 1.

Potassium hydroxide, sodium hydroxide, ammonia, tetramethylammonium hydroxide or the like can be used as the alkaline solution.

The magnetic disk substrate 1 manufactured as described above then has a multi-layer film formed thereon in a subsequent film formation step, thus manufacturing a magnetic disk, i.e. an information recording medium. Specifically, in the film formation step, a seed layer, a foundation layer, a magnetic layer and a protective layer are built up in this order on the magnetic disk substrate 1 using a known sputtering method. A lubricant layer is then formed on the surface of the protective layer by an immersion method, thus completing the manufacture of the information recording medium.

According to the manufacturing method described above, even if the glass substrate 10 is exposed to a high temperature in chemical strengthening treatment, sputtering or the like, relaxation expansion due to the heat is suppressed. As a result, the formation of abnormal projections can be avoided, and a magnetic disk substrate 1 can be manufactured having at least 150 minute projections 2 having a projection height of at least 2 nm per 100 $\mu m^2$, and with a maximum projection height Rp of less than 3.6 nm.

A magnetic disk can thus be obtained for which head crashes and thermal asperity do not occur even if the magnetic disk is driven at a low flying height of 10 nm or less, and the floating stability of the magnetic head is not impaired.

Moreover, a large number of minute projections 2 are formed at high density on the substrate surfaces of the magnetic disk substrate 1, and hence damage does not occur during restart due to the magnetic head and the magnetic disk sticking together, and moreover smooth driving can be secured.

Figure 5:
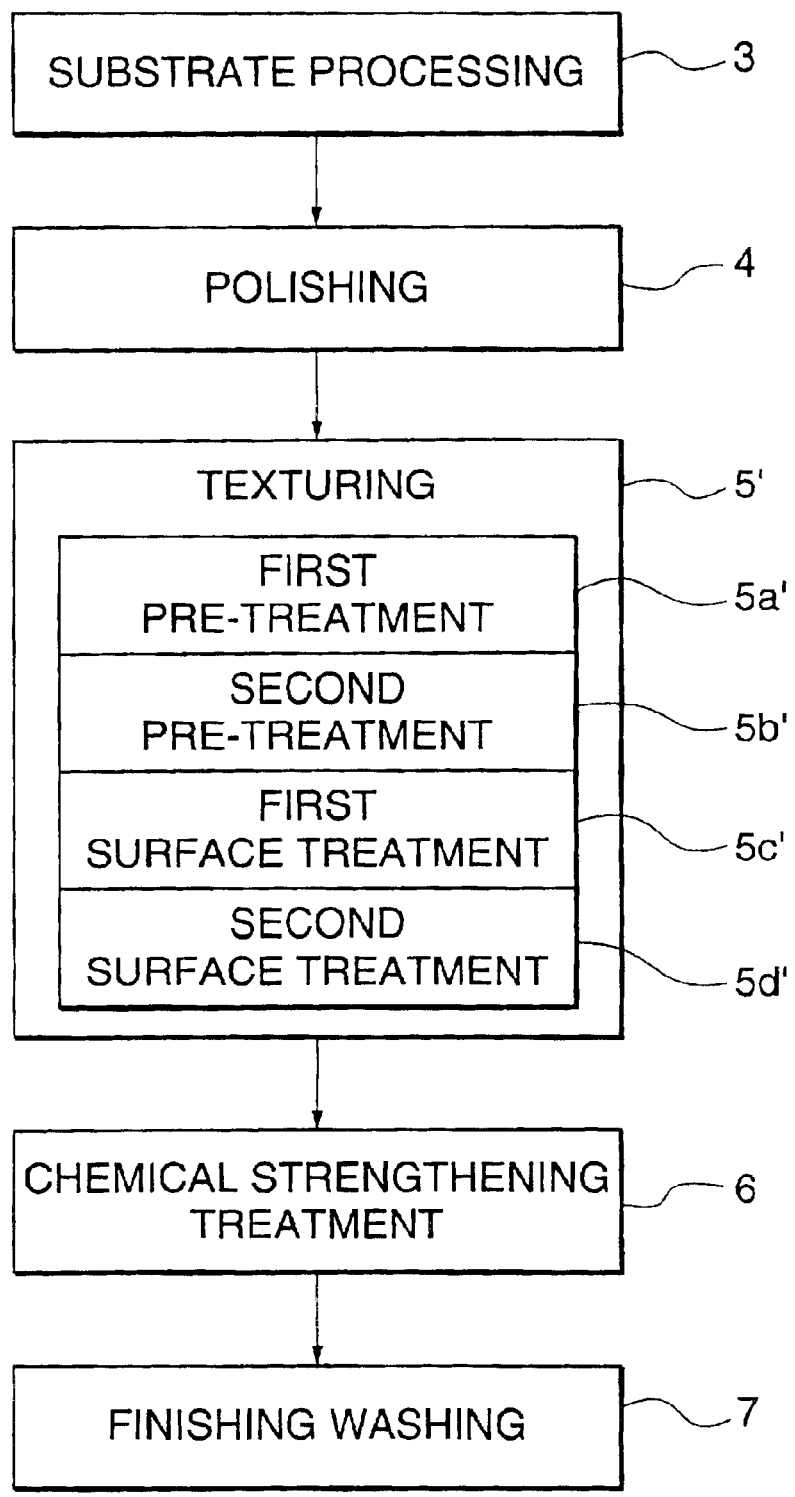
FIG. 5 is a flowchart showing a method of manufacturing the magnetic disk substrate 1 according to a second embodiment of the present invention.

FIG. 5 is a flowchart showing the method of manufacturing the magnetic disk substrate 1 according to a second embodiment of the present invention. The substrate processing step 3, the polishing step 4, the chemical strengthening treatment step 6, and the finishing washing step 7 shown in FIG. 5 are carried out as described above in the first embodiment. However, in the second embodiment, a texturing step 5' is carried out instead of the texturing step 5 carried out in the first embodiment.

In the texturing step 5', first and second surface treatments 5c' and 5d' are carried out as described above in the first embodiment, but before this first pre-treatment 5a' is carried out using an acidic solution followed by second pre-treatment 5b' using an alkaline solution. As a result, the number of minute projections 2 is increased, and hence a texture of yet higher density can be obtained.

Figure 6A:
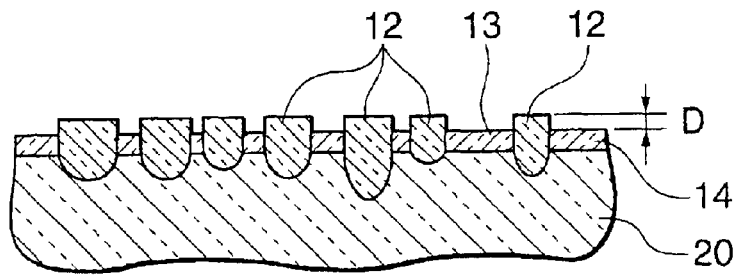
FIGS. 6A to 6D are sectional views of a glass substrate useful in explaining surface treatments carried out in a texturing step 5' in the second embodiment; specifically.

Specifically, in the first pre-treatment 5a', surface treatment is carried out using an acidic solution, thus slightly etching uncompressed layers 13 and hence forming a level difference D on the surfaces of the glass substrate 20, as shown in FIG. 6A. That is, as in the first embodiment, in the second embodiment compressed layers 12 and uncompressed layers 13 are formed in the polishing step 4. $SiO_2$, which has good acid resistance, is densified in the compressed layers 12, and hence the compressed layers 12 are hardly etched in the first pre-treatment 5a'. The uncompressed layers 13 are thus selectively etched, resulting in the level difference D being formed on the surfaces of the glass substrate 20.

There are no particular limitations on the acidic solution used in the first pre-treatment 5a', but to form the desired level difference D, it is preferable for the acidic solution to have a pH of not more than 4. Specifically, one or more acids selected from the group consisting of sulfuric acid, nitric acid, hydrochloric acid and phosphoric acid can be used.

After the first pre-treatment 5a' has been completed, in the second pre-treatment 5b' alkali washing is carried out using an alkaline solution. The reason for this is as follows. In the first pre-treatment 5a', a level difference D is formed on the surfaces of the glass substrate 20 as described above, but in addition an $SiO_2$-rich component is leached out, and hence an altered layer 14 that is soft and has a low mechanical strength is formed on the surfaces of the glass substrate 20.

Figure 6B:
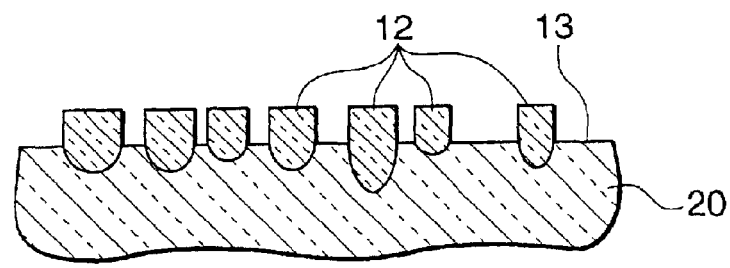

In the second pre-treatment 5b', alkali washing with an alkaline solution is thus carried out to remove the altered layer 14 and hence harden the surface layer, as shown in FIG. 6B.

Figure 6C:
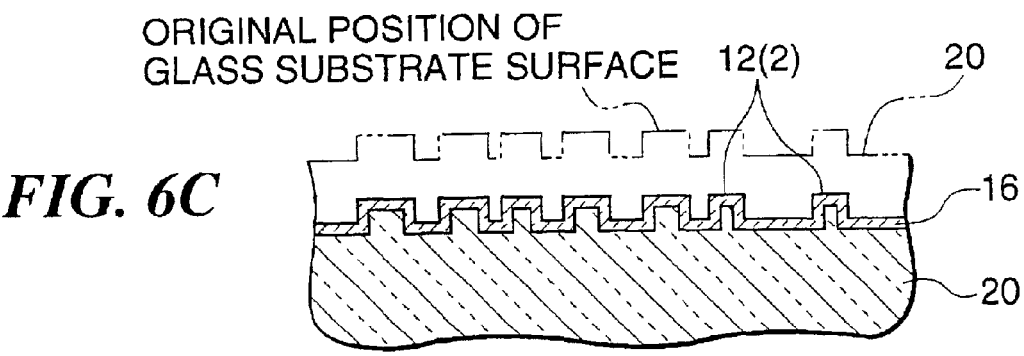

After the second pre-treatment 5b', the first surface treatment 5c' is carried out as in the first embodiment, using an acidic solution prepared by adding an alkaline compound to hydrofluoric acid as an etching liquid. As a result, a large number of minute projections 2 and an altered layer 16 are formed, as shown in FIG. 6C.

Figure 6D:
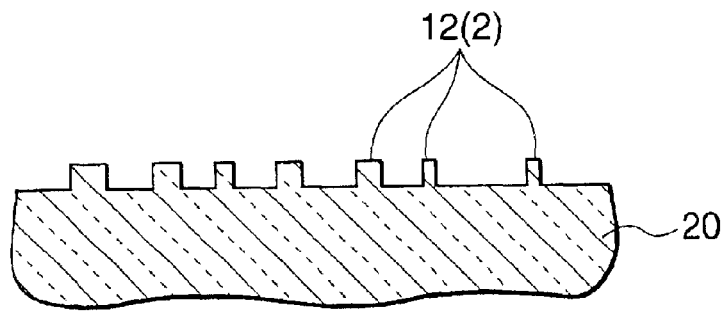

After the first surface treatment 5c' has been completed, in the second surface treatment 5d' the altered layer 16 is removed using an alkaline solution, as shown in FIG. 6D. The chemical strengthening treatment step 6 and the finishing washing step 7 are then carried out, thus completing the manufacture of the magnetic disk substrate 1.

In the present second embodiment, by carrying out the first and second pre-treatments 5a' and 5b' before carrying out the first surface treatment 5c', the level difference D is formed, i.e. minute projections 2 are formed to some extent. Then, by carrying out the first and second surface treatments 5c' and 5d' as in the first embodiment, the projection height is reduced, and a magnetic disk substrate 1 can be manufactured having a large number of minute projections 2 at a yet higher density than in the first embodiment.

Specific examples of the present invention will now be described.

First Examples

The present inventors formed glass sheets by melting an aluminosilicate glass having a chemical composition of 67 mol % $SiO_2$, 10 mol % $Al_2O_3$, 7.5 mol % $Li_2O$, 8.5 mol % $Na_2O$, 3.0 mol % MgO and 4.0 mol % CaO and using a float process, next ground each of the glass sheets using diamond grindstones, and then polished the inner and outer peripheral surfaces of each of the glass sheets to a mirror finish, thus preparing donut-shaped glass substrates having an outside diameter of 65 mm, an inside diameter of 20 mm, and a thickness of 0.6 mm.

It should be noted that, as is clear from the above chemical composition, the glass substrates were prepared such that the total alkaline earth metal oxide content (MgO plus CaO) was 7 mol %, which is within the range of 2 to 15 mol % stipulated in the present invention, and such that ($SiO_2$ content)–½($Al_2O_3$ content) was 61%, which is within the range of 58 to 64 mol % specified as being preferable in the present invention.

Next, in a precision polishing step, each of the glass substrates was polished using a polishing agent comprised of $CeO_2$ abrasive grains (grain diameter 1.2 $\mu$m) dispersed in a polishing liquid and suede-type polishing pads made of artificial leather, whereupon polishing marks (abrasive marks) were formed at random on the surfaces of the glass substrate, thus forming compressed layers. Each of the glass substrates was then washed in a shower of pure water, thus roughly removing polishing agent attached to the surfaces of the glass substrate.

The surface properties of the glass substrates were observed using an atomic force microscope after the precision polishing, whereupon it was found that the surface roughness Ra was 0.44 nm, the maximum projection height Rp was 19.1 nm, and the number of minute projections having a projection height in a range of 2 to 3 nm was 22 per 100 $m^2$ (i.e. 22 in a 10 $\mu m \times 10$ $\mu m$ area).

Next, the precision-polished glass substrates were subjected to first and second surface treatments, thus etching the substrate surfaces, and then to chemical strengthening treatment, as described below for Examples 1 to 3 and Comparative Examples 1 to 3. The surface properties of the glass substrates were evaluated before and after the chemical strengthening treatment.

EXAMPLE 1

The present inventors first prepared a solution of 0.030 wt % hydrofluoric acid (HF) and 0.010 wt % TMAH (N(CH$_3$)$_4$OH) maintained at a temperature of 50° C., thus preparing an acidic solution containing both hydrofluoric acid and tetramethylammonium fluoride (a fluoride salt) having a ratio X of 0.927.

Here, the ratio X is defined as in equation (2) below.

$$X = ([HF]+[H^+])/([HF]+[F^-]) \qquad (2)$$

The molecular weight of hydrofluoric acid is 20, and the molecular weight of TMAH is 91, and hence ([HF]+[F$^-$]) is $1.5 \times 10^{-3}$ (=0.030/20) and ([HF]+[H$^+$]) is $1.39 \times 10^{-3}$ ($1.5 \times 10^{-3} - 0.11 \times 10^{-3}$ (=0.010/91)); substituting these values into equation (2) gives a ratio X of 0.927. The acidic solution used as the etching liquid was thus prepared using amounts of hydrofluoric acid and TMAH such that the value of the ratio X was within the range of 0.3 to 0.98 stipulated in the present invention (and moreover within the range of 0.56 to 0.93 specified as being preferable in the present invention).

Next, the present inventors immersed one of the precision-polished glass substrates described above in the etching liquid described above for 2.5 minutes while irradiating with ultrasound of frequency 48 kHz and output power 1 kW/cm$^2$; the glass substrate was then thoroughly washed by immersing in a bath of pure water (first surface treatment). Next, the glass substrate was immersed for 2.5 minutes in a potassium hydroxide (KOH) aqueous solution of pH 12, thus removing the altered layer formed in the first surface treatment (second surface treatment). The glass substrate was then washed 3 times by immersing in a bath of pure water, and then the glass substrate was dried for 1 minute in IPA vapor. As a result of the above, a test piece was prepared in which a large number of minute projections were formed on the glass substrate. The surface properties of the test piece were observed using an atomic force microscope.

Next, a molten salt was prepared by mixing reagent grade 1 sodium nitrate and reagent grade 1 potassium nitrate in a weight ratio of 20:80 and melting the mixture by heating to a temperature of 380° C. The test piece was immersed in the molten salt and left for 3 hours, thus carrying out chemical strengthening treatment in which Li$^+$ and Na$^+$ in the glass substrate were replaced through ion exchange with K$^+$, which has a larger ionic radius than Li$^+$ and Na$^+$.

After the chemical strengthening treatment, a step of immersing the test piece in a bath of pure water was repeated 3 times, thus washing off molten salt attached to the surfaces of the glass substrate, and then the glass substrate was dried for 1 minute in IPA vapor. The surface properties of the test piece were then observed again using an atomic force microscope.

EXAMPLE 2

The present inventors first prepared a solution of 0.030 wt % hydrofluoric acid (HF) and 0.040 wt % TMAH maintained at a temperature of 50° C., thus preparing an acidic solution containing both hydrofluoric acid and tetramethylammonium fluoride (a fluoride salt) having a ratio X of 0.707.

Specifically, in this case, [HF] is $1.5 \times 10^{-3}$ (=0.030/20), [F$^-$] is 0, and [H$^+$] is reduced by $0.44 \times 10^{-3}$ (=0.040/91); equation (2) thus gives a ratio X of 0.707. In Example 2, the acidic solution used as the etching liquid was thus again prepared using amounts of hydrofluoric acid and TMAH such that the value of the ratio X was within the range of 0.3 to 0.98 stipulated in the present invention (and moreover within the range of 0.56 to 0.93 specified as being preferable in the present invention).

Next, first surface treatment was carried out on one of the precision-polished glass substrates described above using the same procedure as in Example 1 but with the etching liquid (acidic solution) prepared as described above, and then second surface treatment was carried out using the same procedure as in Example 1, thus preparing a test piece in which a large number of minute projections were formed on the glass substrate. The surface properties of the test piece were then observed using an atomic force microscope.

Next, chemical strengthening treatment was carried out using the same procedure as in Example 1, and then the test piece was washed in a bath of pure water and dried as in Example 1. The surface properties of the test piece were then observed again using an atomic force microscope.

EXAMPLE 3

The present inventors first prepared a solution of 0.030 wt % hydrofluoric acid (HF) and 0.060 wt % TMAH maintained at a temperature of 50° C., thus preparing an acidic solution containing both hydrofluoric acid and tetramethylammonium fluoride (a fluoride salt) having a ratio X of 0.561.

Specifically, in this case, ([HF]+[F$^+$]) is $1.5 \times 10^{-3}$ (=0.030/20), ([HF]+[H$^+$]) is $0.84 \times 10^{-3}$ ($1.5 \times 10^{-3} - 0.66 \times 10^{-3}$ (=0.060/91)); equation (2) thus gives a ratio X of 0.561. In Example 3, the acidic solution used as the etching liquid was thus again prepared using amounts of hydrofluoric acid and TMAH such that the value of the ratio X was within the range of 0.3 to 0.98 stipulated in the present invention (and moreover within the range of 0.56 to 0.93 specified as being preferable in the present invention).

Next, first surface treatment was carried out on one of the precision-polished glass substrates described above using the same procedure as in Example 1 but with the etching liquid (acidic solution) prepared as described above, and then second surface treatment was carried out using the same procedure as in Example 1, thus preparing a test piece in which a large number of minute projections were formed on the glass substrate. The surface properties of the test piece were then observed using an atomic force microscope.

Next, chemical strengthening treatment was carried out using the same procedure as in Example 1, and then the test piece was washed in a bath of pure water and dried as in Example 1. The surface properties of the test piece were then observed again using an atomic force microscope.

Comparative Example 1

The present inventors subjected one of the precision-polished glass substrates described above to first surface treatment using a 0.015 wt % hydrofluoric acid solution maintained at a temperature of 50° C. as the etching liquid, and then carried out second surface treatment using the same procedure as in Example 1, thus preparing a test piece. The surface properties of the test piece were then observed using an atomic force microscope.

Next, chemical strengthening treatment was carried out using the same procedure as in Example 1, and then the test piece was washed in a bath of pure water and dried as in Example 1. The surface properties of the test piece were then observed again using an atomic force microscope.

Comparative Example 2

The present inventors subjected one of the precision-polished glass substrates described above to first surface treatment using a 0.030 wt % hydrofluoric acid solution maintained at a temperature of 50° C. as the etching liquid, and then carried out second surface treatment using the same procedure as in Example 1, thus preparing a test piece. The surface properties of the test piece were then observed using an atomic force microscope.

Next, chemical strengthening treatment was carried out using the same procedure as in Example 1, and then the test piece was washed in a bath of pure water and dried as in Example 1. The surface properties of the test piece were then observed again using an atomic force microscope.

Comparative Example 3

The present inventors first prepared a solution of 0.030 wt % hydrofluoric acid and 0.500 wt % ammonium fluoride ($NH_4F$; a fluoride salt) maintained at a temperature of 50° C., thus preparing an acidic solution having a ratio x of 0.100.

Specifically, in this case, [HF] is $1.5 \times 10^{-3}$ (=0.030/20), [$H^+$] is 0, and because the molecular weight of ammonium fluoride is 37, [$F^-$] is $13.5 \times 10^{-3}$ (=0.500/37); equation (2) thus gives a ratio X of 0.100. In Comparative Example 2, the acidic solution used as the etching liquid was thus prepared using amounts of hydrofluoric acid and ammonium fluoride such that the value of the ratio X was outside the range stipulated in the present invention.

Next, first surface treatment was carried out on one of the precision-polished glass substrates described above using the same procedure as in Example 1 but with the etching liquid (acidic solution) prepared as described above, and then second surface treatment was carried out using the same procedure as in Example 1, thus preparing a test piece in which a large number of minute projections were formed on the glass substrate. The surface properties of the test piece were then observed using an atomic force microscope.

Next, chemical strengthening treatment was carried out using the same procedure as in Example 1, and then the test piece was washed in a bath of pure water and dried as in Example 1. The surface properties of the test piece were then observed again using an atomic force microscope.

Table 1 shows the composition of the etching liquid used in the examples and comparative examples described above, and Table 2 shows the surface properties before and after the chemical strengthening treatment for these examples and comparative examples.

Note that a Nanoscope IIIa made by Digital Instruments Inc. was used as the atomic force microscope in the surface property observations, and the measurements were taken in tapping mode.

TABLE 1

|  |  |  | First Surface Treatment | | | Second Surface Treatment |
|---|---|---|---|---|---|---|
|  |  | Acidic Solution | HF Concentration (wt %) | Ammonium Compound Concentration (wt %) | Ratio X | Alkaline Solution |
| Examples | 1 | HF + $N(CH_3)_4OH$ | 0.030 | 0.010 | 0.927 | KOH |
|  | 2 | HF + $N(CH_3)_4OH$ | 0.030 | 0.040 | 0.707 | KOH |
|  | 3 | HF + $N(CH_3)_4OH$ | 0.030 | 0.060 | 0.561 | KOH |
| Comparative Examples | 1 | HF | 0.015 | — | 1.000 | KOH |
|  | 2 | HF | 0.030 | — | 1.000 | KOH |
|  | 3 | HF + $NH_4F$ | 0.030 | 0.500 | 0.100 | KOH |

TABLE 2

|  |  | Before Chemical Strengthening Treatment | | | After Chemical Strengthening Treatment | | |
|---|---|---|---|---|---|---|---|
|  |  | Surface Roughness Ra(nm) | Maximum Projection Height Rp(nm) | No. of Projections per 100 $\mu m^2$ | Surface Roughness Ra(nm) | Maximum Projection Height Rp(nm) | No. of Projections per 100 $\mu m^2$ |
| Examples | 1 | 0.59 | 3.0 | 320 | 0.59 | 3.0 | 350 |
|  | 2 | 0.54 | 2.9 | 190 | 0.55 | 2.9 | 190 |
|  | 3 | 0.54 | 2.9 | 180 | 0.54 | 2.9 | 170 |
| Comparative Examples | 1 | 0.55 | 3.1 | 80 | 0.59 | 3.6 | 120 |
|  | 2 | 0.61 | 3.8 | 400 | 0.62 | 4.1 | 500 |
|  | 3 | 0.50 | 14.1 | 45 | 0.50 | 8.4 | 40 |

The following can be seen from Tables 1 and 2. In Comparative Example 1, the first surface treatment was carried out using only hydrofluoric acid, but the hydrofluoric acid concentration was low at 0.015 wt %. As a result, before the chemical strengthening treatment, the maximum projection height Rp was low at 3.1 nm, but the number of minute projections was low at 80 per 100 $\mu m^2$. Moreover, after the chemical strengthening treatment, the maximum projection height Rp had increased to 3.6 nm due to relaxation expansion due to the heat in the chemical strengthening treatment, resulting in there being a risk of thermal asperity and head crashes occurring. Moreover, the number of projections was still low at 120 per 100 $\mu m^2$ even after the chemical strengthening treatment, and hence there is a risk that in the case of use as a magnetic disk, the magnetic head and the magnetic disk would be prone to sticking together, resulting in it being difficult to achieve smooth startup.

Moreover, in Comparative Example 2, the first surface treatment was carried out using only hydrofluoric acid as in Comparative Example 1, but the hydrofluoric acid concentration was high at 0.030 wt %. As a result, even before the chemical strengthening treatment, the number of projections was high at 400 per 100 $\mu m^2$, but the maximum projection height Rp was high at 3.8 nm. Moreover, after the chemical strengthening treatment, the number of projections had increased to 500 per 100 $\mu m^2$, but the maximum projection height Rp had further increased to 4.1 nm due to relaxation expansion due to the heat in the chemical strengthening treatment, resulting in there being a risk of thermal asperity and head crashes occurring.

Moreover, in Comparative Example 3, a large amount of ammonium fluoride was put into the acidic solution used as the etching liquid in the first surface treatment, since then $SiO_2$ contained in the glass substrate 10 will react with the ammonium fluoride to produce a precipitate (($NH_4)_2SiF_6$). The number of projections was thus very low, specifically 45 per 100 $\mu m^2$ before the chemical strengthening treatment and 40 per 100 $\mu m^2$ after the chemical strengthening treatment. Moreover, it was not possible to completely remove fine $CeO_2$ grains that had formed impressions from the surfaces of the glass substrate, and hence soiling on the surfaces of the glass substrate was apparent, and it was found that there were abnormal projections with a large maximum projection height Rp.

In contrast with the above, in Examples 1 to 3, the first surface treatment was carried out using an acidic etching liquid prepared such that the ratio X was in the range of 0.56 to 0.93 specified as being preferable in the present invention. As a result, there was virtually no change in the surface properties between before and after the chemical strengthening treatment, and it was possible to manufacture a magnetic disk substrate 1 having a number of minute projections of more than 150 per 100 $\mu m^2$ and with a maximum projection height Rp of less than 3.6 nm.

Second Examples

The present inventors prepared glass substrates having a composition the same as in the First Examples, and then carried out precision polishing as in the First Examples. Test pieces were then prepared by subjecting the precision-polished glass substrates to first and second pre-treatments and then to first and second surface treatments (Examples 5 to 7). The surface properties of the resulting test pieces were compared with a test piece for which only the first and second surface treatments were carried out (i.e. the first and second pre-treatments were not carried out) (Example 4).

EXAMPLE 4

The present inventors first prepared a solution of 0.025 wt % hydrofluoric acid (HF) and 0.10 wt % TMAH maintained at a temperature of 50° C., thus preparing an acidic solution containing both hydrofluoric acid and tetramethylammonium fluoride (a fluoride salt) having a ratio X of 0.912.

Specifically, in this case, ([HF]+[$F^{31}$ ]) is $1.25 \times 10^{-3}$ (=0.025/20), ([HF]+[$H^+$]) is $-0.11 \times 10^{-3}$ (=0.010/91); equation (2) thus gives a ratio X of 0.912. In Example 4, the acidic solution used as the etching liquid was thus prepared using amounts of hydrofluoric acid and TMAH such that the value of the ratio X was within the range of 0.3 to 0.98 stipulated in the present invention (and moreover within the range of 0.56 to 0.93 specified as being preferable in the present invention).

Next, first surface treatment was carried out on one of the precision-polished glass substrates described above using the same procedure as in Example 1 but with the etching liquid (acidic solution) prepared as described above, and then second surface treatment was carried out using the same procedure as in Example 1, thus preparing a test piece in which a large number of minute projections were formed on the glass substrate. The surface properties of the test piece were then observed using an atomic force microscope.

Next, chemical strengthening treatment was carried out using the same procedure as in Example 1, and then the test piece was washed in a bath of pure water and dried as in Example 1. The surface properties of the test piece were then observed again using an atomic force microscope.

EXAMPLE 5

The present inventors first prepared a (0.005 wt %) hydrofluoric acid aqueous solution of pH 3.1 maintained at a temperature of 50° C., and then carried out first pre-treatment by immersing one of the precision-polished glass substrates described above in the hydrofluoric acid aqueous solution for 5 minutes while irradiating with ultrasound of frequency 48 kHz and output power 1 kW/$cm^2$.

Next, second pre-treatment was carried out by immersing the glass substrate in a potassium hydroxide (KOH) aqueous solution of pH 12 for 2.5 minutes to remove the altered layer formed through the first pre-treatment, then carrying out washing 3 times by immersing the glass substrate in a bath of pure water, and then drying the glass substrate in IPA vapor for 1 minute.

Etching (first surface treatment) was then carried out using the same acidic solution as in Example 4, and then second surface treatment was carried out using the same procedure as in Example 4, thus preparing a test piece in which a large number of minute projections were formed on the glass substrate. The surface properties of the test piece were then observed using an atomic force microscope.

Next, chemical strengthening treatment was carried out using the same procedure as in Example 4, and then the test piece was washed in a bath of pure water and dried as in Example 4. The surface properties of the test piece were then observed again using an atomic force microscope.

EXAMPLE 6

The present inventors first prepared a (0.5 wt %) sulfuric acid aqueous solution of pH 1 maintained at a temperature of 50° C., and then carried out first pre-treatment by immersing one of the precision-polished glass substrates described above in the sulfuric acid aqueous solution for 5 minutes while irradiating with ultrasound of frequency 48 kHz and output power 1 kW/$cm^2$.

Second pre-treatment and first and second surface treatments were than carried out in that order using the same procedures as in Example 5, thus preparing a test piece in which a large number of minute projections were formed on the glass substrate. The surface properties of the test piece were then observed using an atomic force microscope.

Next, chemical strengthening treatment was carried out using the same procedure as in Example 5, and then the test piece was washed in a bath of pure water and dried as in Example 5. The surface properties of the test piece were then observed again using an atomic force microscope.

EXAMPLE 7

The present inventors first prepared a standard phthalic acid ($C_6H_4(COOH)_2$) solution of pH 4.1, and then carried out first pre-treatment by immersing one of the precision-polished glass substrates described above in the standard phthalic acid solution for 5 minutes while irradiating with ultrasound of frequency 48 kHz and output power 1 kW/cm$^2$.

Second pre-treatment and first and second surface treatments were than carried out in that order using the same procedures as in Example 5, thus preparing a test piece in which a large number of minute projections were formed on the glass substrate. The surface properties of the test piece were then observed using an atomic force microscope.

Next, chemical strengthening treatment was carried out using the same procedure as in Example 5, and then the test piece was washed in a bath of pure water and dried as in Example 5. The surface properties of the test piece were then observed again using an atomic force microscope.

Table 3 shows the compositions of the chemical solutions used in the examples described above, and Table 4 shows the surface properties before and after the chemical strengthening treatment for these examples.

Note that, as in the First Examples, a Nanoscope IIIa made by Digital Instruments Inc. was used as the atomic force microscope in the surface property observations, and the measurements were taken in tapping mode.

Comparing Examples 5 to 7 with Example 4, in the case that first and second pre-treatments were carried out, compared with the case that first and second pre-treatments were not carried out, the number of minute projections was higher, and hence it was possible to further increase the density of the minute projections, thus making the magnetic disk substrate yet more suitable for smooth driving at a low flying height. Moreover, the maximum projection height Rp after the chemical strengthening treatment was kept down below 3.6 nm, and hence abnormal projections did not arise. Even in the case that the magnetic head flies over the magnetic disk at a low flying height, it will thus be possible to avoid the occurrence of thermal asperity and head crashes.

What is claimed is:

1. A method of manufacturing a substrate for information recording media, comprising the steps of:
    carrying out precision polishing on a glass substrate containing $SiO_2$ and $Al_2O_3$ using a polishing agent to generate compressed layers and uncompressed layers on a surface of said glass subtrate; and
    after said precision polishing, carrying out surface treatment using an acidic etching liquid containing both hydrofluoric acid and a fluoride salt to form a large number of minute projections on the polished surface.

2. A method of manufacturing a substrate for information recording media as claimed in claim 1, wherein the etching liquid is prepared such that a ratio X of a sum of a concentration per mol of the hydrofluoric acid and a concentration per mol of hydrogen ions to a sum of a concentration per mol of the hydrofluoric acid and a concentration per mol of fluoride ions is in a range of 0.3 to 0.98.

3. A method of manufacturing a substrate for information recording media as claimed in claim 2, wherein the etching liquid is prepared such that the ratio X is in a range of 0.56 to 0.93.

4. A method of manufacturing a substrate for information recording media as claimed in claim 1, wherein the etching liquid is a solution in which hydrogen ions have been replaced with other monovalent cations.

TABLE 3

| | | First Pre-Treatment | | | Second Pre-Treatment | First Surface Treatment | | | | Second Surface Treatment |
|---|---|---|---|---|---|---|---|---|---|---|
| | | | | | | | HF | Ammonium Compound | | |
| | | Acidic Solution | Concentration (wt %) | pH | Alkaline Solution | Acidic Solution | Concentration (wt %) | Concentration (wt %) | Ratio X | Alkaline Solution |
| Examples | 4 | — | — | — | — | HF + N(OH$_3$)$_4$OH | 0.025 | 0.010 | 0.912 | KOH |
| | 5 | HF | 0.005 | 3.1 | KOH | HF + N(OH$_3$)$_4$OH | 0.025 | 0.010 | 0.912 | KOH |
| | 6 | H$_2$SO$_4$ | 0.500 | 1 | KOH | HF + N(OH$_3$)$_4$OH | 0.025 | 0.010 | 0.912 | KOH |
| | 7 | C$_6$H$_4$(COOH)$_2$ | — | 4.1 | KOH | HF + N(OH$_3$)$_4$OH | 0.025 | 0.010 | 0.912 | KOH |

TABLE 4

| | | Before Chemical Strengthening Treatment | | | After Chemical Strengthening Treatment | | |
|---|---|---|---|---|---|---|---|
| | | Surface Roughness Ra(nm) | Maximum Projections Height Rp(nm) | No. of Projection per 100 μm$^2$ | Surface Roughness Ra(nm) | Maximum Projection Height Rp(nm) | No. of Projections per 100 μm$^2$ |
| Examples | 4 | — | — | — | 0.58 | 2.9 | 250 |
| | 5 | 0.61 | 3.1 | 500 | 0.61 | 3.2 | 520 |
| | 6 | 0.61 | 4.0 | 350 | 0.61 | 3.3 | 440 |
| | 7 | 0.57 | 2.9 | 270 | 0.58 | 3.0 | 270 |

5. A method of manufacturing a substrate for information recording media as claimed in claim 4, wherein the monovalent cations are alkylammonium ions.

6. A method of manufacturing a substrate for information recording media as claimed in claimed 1, wherein said surface treatment comprises carrying out a first surface treatment using the etching liquid, and then carrying out a second surface treatment using an alkaline solution.

7. A method of manufacturing a substrate for information recording media as claimed in claim 1, further comprising the step of carrying out a pre-treatment at least once using an acidic solution, before carrying out said surface treatment.

8. A method of manufacturing a substrate for information recording media as claimed in claim 1, further comprising the steps of carrying out a first pre-treatment at least once using an acidic solution and then carrying out a second pre-treatment using an alkaline solution, before carrying out said surface treatment.

9. A method of manufacturing a substrate for information recording media as claimed in claim 7, wherein a pH of said acidic solution is not more than 4.

10. A method of manufacturing a substrate for information recording media as claimed in claim 1, wherein a difference between the $SiO_2$ content and half of the $Al_2O_3$ content is in a range of 53 to 66 mol %.

11. A method of manufacturing a substrate for information recording media as claimed in claim 10, wherein the difference between the $SiO_2$ content and half of the $Al_2O_3$ content is in a range of 58 to 64 mol %.

12. A method of manufacturing a substrate for information recording media as claimed in claim 1, wherein the glass substrate has a composition in a range of 63 to 7 mol % of $SiO_2$, 4 to 11 mol % of $Al_2O_3$, 5 to 11 mol % of $Li_2O$, 6 to 14 mol % of $Na_2O$, 0 to 2 mol % of $K_2O$, 0 to 5 mol % of $Ti_2O$, 0 to 2.5 mol % of $ZrO_2$, and 0 to 6 mol % of MgO, 1 to 9 mol % of CaO, 0 to 3 mol % of SrO and 0 to 2 mol % of BaO, wherein a total content of MgO, CaO, SrO and BaO is in a range of 2 to 15 mol %.

13. A method of manufacturing a substrate for information recording media as claimed in claim 1, wherein the polishing agent contains loose abrasive grains having a mean grain diameter in a range of 0.01 $\mu$m to 3 $\mu$m.

14. A method of manufacturing a substrate for information recording media as claimed in claim 2, wherein said surface treatment comprises carrying out a first surface treatment using the etching liquid, and then carrying out a second surface using an alkaline solution.

15. A method of manufaturing a substrate for information recording media as claimed in claim 3, wherein said surface treatment comprises carrying out a first surface treatment using the etching liquid, and then carrying out a second surface treatment using an alkaline solution.

16. A method of manufacturing a substrate for information recording media as claimed in claim 4, wherein said surface treatment comprises carrying out a first surface treatment using the etching liquid, and then carrying out a second surface treatment using an alkaline solution.

17. A method of manufacturing a substrate for information recording media as claimed in claim 5, wherein said surface treatment comprises carrying out a first surface treatment using the etching liquid, and then carrying out a second surface treatment using an alkaline solution.

18. A method of manufacturing a substrate for information recording media as claimed in claim 8, wherein a pH of said acidic solution is not more than 4.

19. A method of manufacturing a substrate for information recording media as claimed in claim 1, wherein a density of the minute projections having a projection height of not less than 2 nm is not less than 150 per 100 $\mu m^2$, and a maximum projection height from a mean value of the projection height is less than 3.6 nm.

* * * * *